United States Patent [19]
Thomson

[11] Patent Number: 5,699,823
[45] Date of Patent: Dec. 23, 1997

[54] BREAKAWAY COUPLING

[75] Inventor: Jack Gall Thomson, Nottingham, United Kingdom

[73] Assignee: Dover Corp., New York, N.Y.

[21] Appl. No.: 717,284

[22] Filed: Sep. 20, 1996

[30] Foreign Application Priority Data

Sep. 20, 1995 [GB] United Kingdom .................... 9519193
May 8, 1996 [GB] United Kingdom .................... 9609589

[51] Int. Cl.[6] ................................................ F16L 37/28
[52] U.S. Cl. ............................ 137/68.15; 137/614.01; 251/149.2
[58] Field of Search ............................. 137/614, 614.01, 137/68.14, 68.15; 251/149.2, 66, 74

[56] References Cited

U.S. PATENT DOCUMENTS

| 2,824,755 | 2/1958 | Lamphear | 251/149.2 |
|---|---|---|---|
| 3,077,330 | 2/1963 | Lomphear | 251/149.2 |
| 4,023,584 | 5/1977 | Rogers et al. | 137/68.14 |
| 4,361,165 | 11/1982 | Flory | 137/68.15 |
| 4,625,746 | 12/1986 | Calvin et al. | 137/68.15 |
| 4,646,773 | 3/1987 | Klop et al. | 137/68.15 |
| 4,667,883 | 5/1987 | Fink, Jr. | |

FOREIGN PATENT DOCUMENTS

| 2 121 499 | 6/1982 | United Kingdom . |
|---|---|---|
| WO 91/12459 | 1/1991 | WIPO . |

*Primary Examiner*—A. Michael Chambers
*Attorney, Agent, or Firm*—Dinsmore & Shohl LLP

[57] ABSTRACT

A breakaway coupling including first and second coupling parts secured together by releasable means, the releasable means permitting separation of the coupling parts in a given direction when exposed to a separating force in excess of a predetermined force in said direction, at least one of the coupling parts including valve means, the valve means being normally retained at an open position and being movable to a closed position when said coupling parts move apart in said direction, the valve means comprising an annular valve seat formed in said one coupling part, a valve element which when seated on the valve seat prevents fluid flow through said one coupling part, the valve element being movably mounted within the coupling part for movement between open and closed positions, the valve element when at said open position being spaced from the valve seat to permit flow of fluid through the coupling part and when at said closed position being seated upon the valve seat to prevent fluid flow through the coupling part, the valve element being pivotally mounted on an elongate support for movement from the open position to an intermediate position whereat it is opposed to said valve seat but spaced therefrom in said given direction, the support extending longitudinally in said given direction and being movable in said given direction between a first position whereat the support locates the valve element at its open position and a second position whereat the support locates the valve element at its closed position, trigger release means for retaining the support at its first position, the valve element being co-operable with the trigger release means to cause release of the support when the valve element moves to its intermediate position to thereby enable the support to move to its second position and the valve element to move to its closed position.

10 Claims, 3 Drawing Sheets

BREAKAWAY COUPLING

Breakaway coupling for fluid conveying conduits (e.g. pipes and/or hoses) are known which separate when a separating force exceeding a predetermined force is applied along the conduit. The couplings normally comprise two coupling halves which upon separation remain with the conduit portion to which they are attached. One or both of the coupling halves may contain a valve assembly which on separation of the halves is activated to close-off fluid flow through the coupling half. This is advantageous since it isolates fluid contained within the conduit portion to which the coupling half is attached and so prevents undesirable fluid spillage.

A general aim of the present invention is to provide an improved breakaway fluid coupling of the type outlined above.

According to one aspect of the present invention there is provided a breakaway coupling including first and second coupling parts secured together by releasable means, the releasable means permitting separation of the coupling parts in a given direction when exposed to a separating force in excess of a predetermined force in said direction, at least one of the coupling parts including valve means, the valve means being normally retained at an open position and being movable to a closed position when said coupling parts move apart in said direction, the valve means comprising an annular valve seat formed in said one coupling part, a valve element which when seated on the valve seat prevents fluid flow through said one coupling part, the valve element being movably mounted within the coupling part for movement between open and closed positions, the valve element when at said open position being spaced from the valve seat to permit flow of fluid through the coupling part and when at said closed position being seated upon the valve seat to prevent fluid flow through the coupling part, the valve element being pivotally mounted on an elongate support for movement from the open position to an intermediate position whereat it is opposed to said valve seat but spaced therefrom in said given direction, the support extending longitudinally in said given direction and being movable in said given direction between a first position whereat the support locates the valve element at its open position and a second position whereat the support locates the valve element at its closed position, trigger release means for retaining the support at its first position, the valve element being co-operable with the trigger release means to cause release of the support when the valve element moves to its intermediate position to thereby enable the support to move to its second position and the valve element to move to its closed position.

Preferably the support is linearly movable between its first and second positions.

Various aspects of the present invention are hereinafter described with reference to the accompanying drawings, in which.

Figure 1:
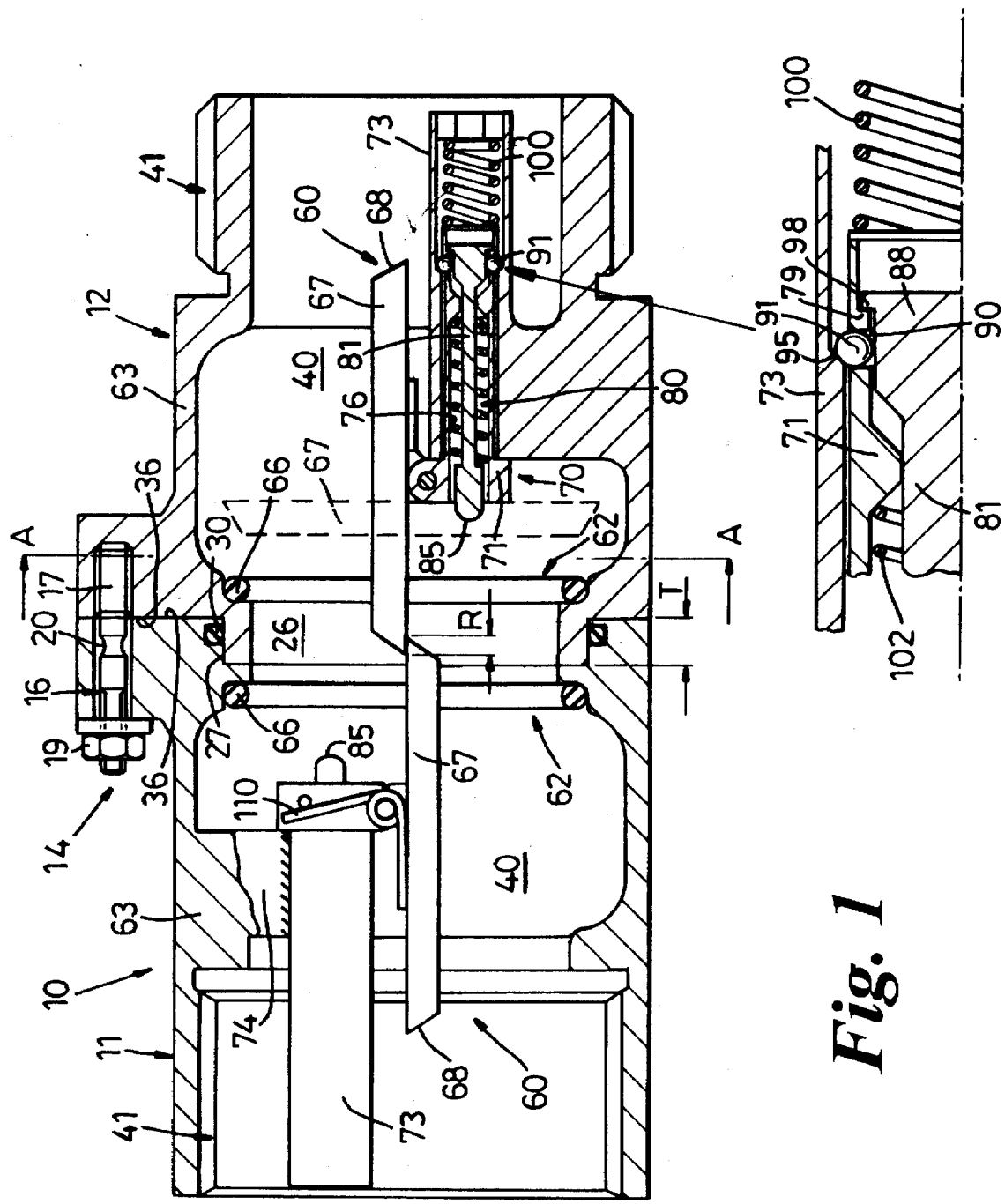
FIG. 1 is an axial cross-sectional view through a coupling according to one embodiment of the present invention.
Figure 2:
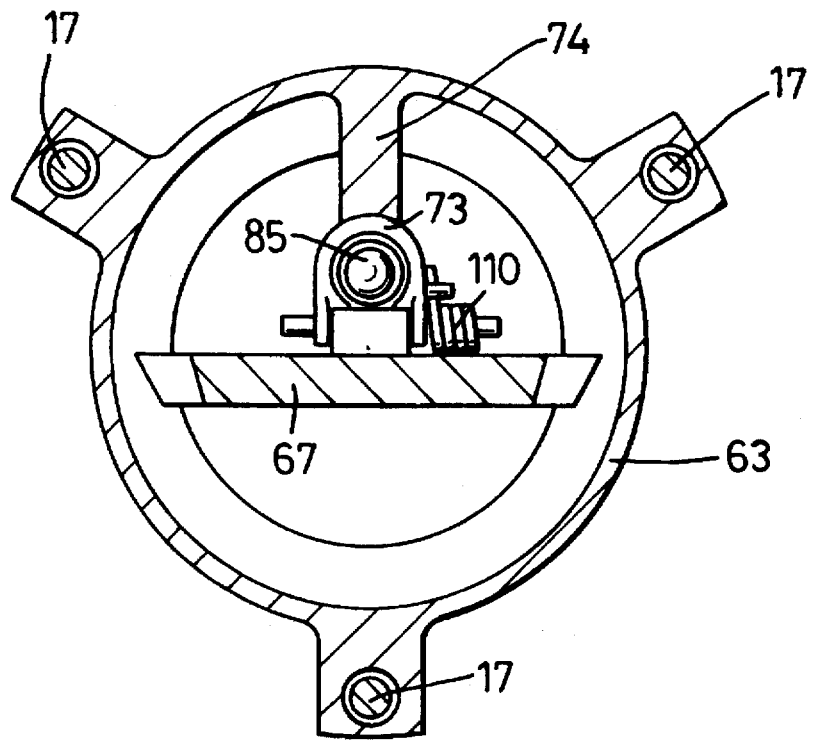
FIG. 2 is a sectional view taken along line A—A in FIG. 1.

The fluid conduit coupling 10 shown in the drawings includes two coupling halves 11, 12 held together against separation in an axial direction by releasable means 14, preferably in the form of frangible bolts 16.

In the illustrated embodiment, three frangible bolts 16 are provided circumferentially spaced about the coupling halves. Each bolt 16 preferably comprise a screw threaded stud 17 made of a suitable frangible material, such is a metal, preferably brass. One end of the stud 17 is threadedly received in one coupling half and projects along a through bore formed in the other coupling half to project therefrom and receive a nut 19.

Preferably the stud 17 has a weakened portion 20 formed for example by a reduction in cross-section which breaks when the stud 17 is exposed to a pulling force in excess of a predetermined separating force acting to separate the coupling halves.

The coupling halves 11, 12 are telescopically engaged with one another over a distance T by the provision of a male portion 26 on one coupling half which is received within a female portion 27 on the other coupling half. A seal 30 is provided in between the male and female portions 26, 27 in order to maintain a seal therebetween whilst the coupling halves are telescopically inter-engaged. Preferably the seal 30 is mounted within an annular groove formed within the female portion 27.

Preferably on tightening of the studs 17, the opposed axial faces 36 of both coupling halves 11, 12 mutually abut and maintain the coupling halves 11, 12 at one limit of their telescopic inter-engagement.

Each coupling half 11, 12 includes a fluid passageway 40 through which fluid flows in use. Each coupling half 11, 12 includes attachment formations 41 for attaching the coupling half to a fluid conduit portion (not shown). In the illustrated embodiment, the attachment formation 41 for coupling half 11 comprises an internally screw threaded portion and the attachment formation 41 for coupling half 12 comprises an externally screw threaded formation.

Preferably each coupling half 11, 12 includes a valve means 60 for preventing flow of fluid through passageway 40 in the event that the coupling halves 11, 12 have been separated by more than a predetermined amount R from one another in the axial direction.

Each valve means 60 includes an annular valve seat 62 formed in the body 63 of the coupling half. The seat 62 surrounds the passageway 40 and is preferably defined by a seal 66.

Each valve means 60 further includes a valve member 67, preferably of plate-like form, which is pivotally mounted on a support 70. Preferably the valve member 67 is of circular shape and has an inclined edge 68 defining a seat for sealingly seating against valve seat 62. The inclined edge 68 helps to align the valve member 67 during seating upon valve seat 62 and thereby helps ensure that a good seal is obtained.

The support 70 includes a support sleeve 71 which is slidably mounted for longitudinal movement in the axial direction of the coupling 10.

The sleeve 71 is contained within a bore of a housing 73 mounted on a boss 74. Preferably housing 73 and boss 74 are formed integrally with the body 63 of the coupling half.

As seen in FIG. 1, the support sleeve 71 is retained at a first axial position by a trigger means 80.

The trigger means 80 includes a push rod 81 slidably located within the bore 76 of sleeve 71. As shown in FIG. 1, one end of the push rod 81 projects beyond the axial end of sleeve 71 to define a striking head 85. The opposite end of the push rod has an enlarged portion 88 (see inset to FIG. 1) which closes off radial bores 90 formed in the sleeve 71. A ball 91 is freely received within each bore 90; the wall thickness of sleeve 71 is less than the diameter of each ball 91 such that the ball 91 normally resides in the position shown so as to project beyond the outer surface of the sleeve 71.

An annular shoulder 95 is provided within the housing 73 against which the balls 91 abut to prevent movement of the sleeve 71 in an axial direction toward the valve seat 62. Biasing means, preferably in the form of a spring 100, are provided for urging the sleeve 71 in said axial direction and so urge the balls 91 into abutting contact with shoulder 95.

The push rod 81 is biased by biasing means, preferably in the form of a spring 102 in an axial direction toward the valve seat 62 so as to maintain the striking head 85 and the enlarged portion 88 in the positions shown in FIG. 1. This position is preferably defined by a shoulder 98 on rod 81 abutting against an internal shoulder 79 formed within sleeve 71.

As illustrated in FIG. 1, the valve elements when in their fully open position overlap one another at a peripheral edge.

Biasing means preferably in the form of a torsion spring 110 are provided for biasing the valve element about its pivot for movement from its fully open position to an intermediate position (as shown in broken lines within coupling half 12). The valve elements are arranged for pivotal movement in opposite directions so that in the positions shown in FIG. 1, their respective biasing means urge the valve elements into abutting contact.

In use, if the coupling 10 is exposed to a pulling force in excess of a predetermined force acting to axially separate the coupling halves, then the coupling halves 11, 12 will move axially apart due to the frangible studs 17 first stretching and then breaking.

As soon as the coupling halves 11, 12 move apart by a distance more than R, the valve elements are released from one another and begin to rotate about their respective pivots toward their intermediate position, initially due to the bias of springs 110 and then also due to fluid pressure.

In the embodiment of FIG. 1 the position of the pivotal connection to the valve element is off-set from the centre of the valve element in order to utilise fluid pressure to assist in biasing the valve element to its intermediate position.

When the valve dement reaches its intermediate position, it strikes the striking head 85 of push rod 81 and causes the push rod 81 to be moved against the bias of spring 102 in an axial direction away from the valve seat 62. Such movement of the push rod 81 causes the enlarged portion 88 to move clear of the bores 90. Due to the bias of spring 100 and fluid pressure acting on the valve element 67 the balls 91 are forced into the interior of sleeve 71. The sleeve 71 is now free to move axially toward valve seat 62 and in so doing permits the valve element to move to its closed position whereat it is seated upon valve seat 62.

Preferably the shoulder 95 has an inclined face to facilitate entry of the balls 91 into bores 90.

Preferably, the distance R is chosen to be less than the distance T. This ensures that the valve means 60 are activated to close off flow and that the coupling 10 remains sealed due to the telescopic inter-engagement of the coupling halves 11, 12 should all the studs 17 not break.

Figure 3:
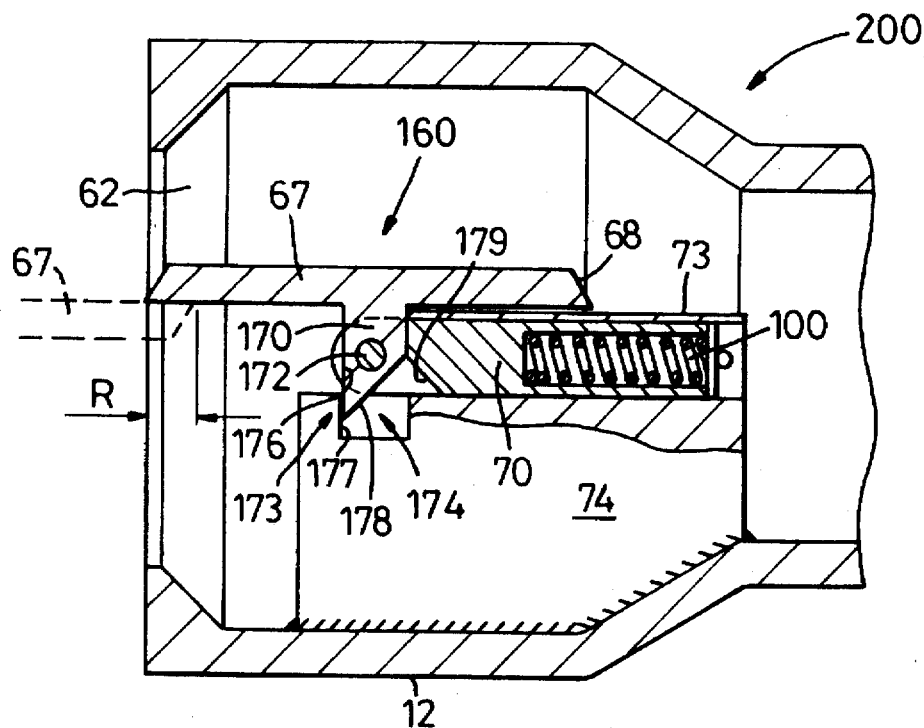
FIG. 3 is an axial cross-sectional view through one half of a coupling according to another embodiment of the present invention shown in the valve open position.
Figure 4:
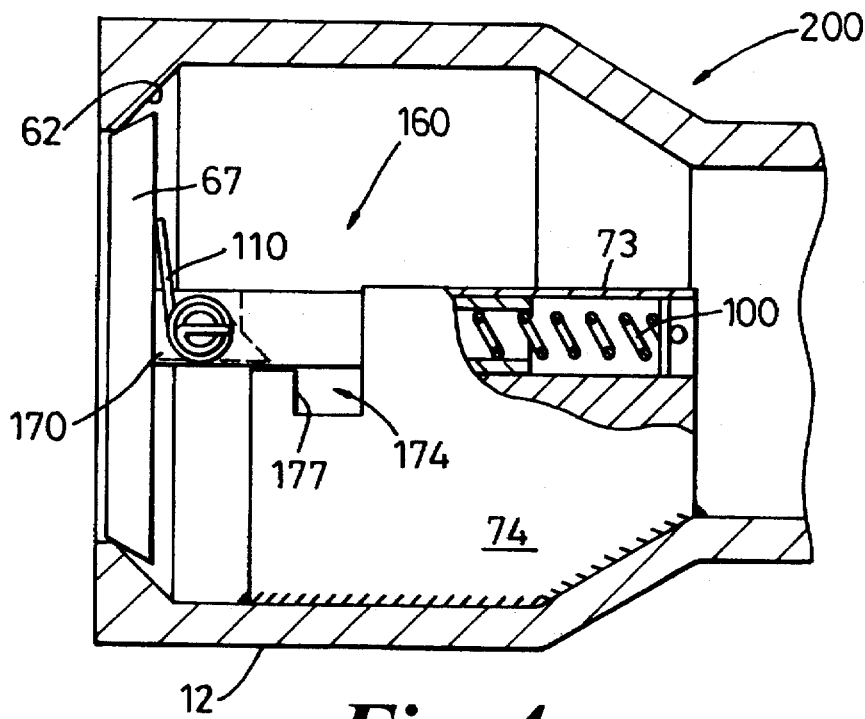
FIG. 4 is a view similar to FIG. 3 showing the coupling half in the valve closed position.

A further embodiment 200 is illustrated in FIGS. 3 and 4 wherein similar parts have been designated by the same reference numbers.

In embodiment 200 the valve member 67 is mounted on a stem 170 which in turn is pivotally connected to the support 70 via a pivot pin 172.

The stem 170 includes a stop projection 173 located on the opposite side of pivot pin 172 to the valve member 67. In embodiment 200 the projection 173 defines the trigger means for retaining the support at its first position. As seen in FIG. 3, when the valve member 67 is located at its fully open position, the projection 173 projects downwardly beyond the longitudinal sides of the support 70 to be received within a recess 174 formed in boss 74.

The support 70 is biased by spring 100 toward the valve seat 62 and so when the valve member 67 is in its fully open position, sidewall 176 of projection 173 is urged into contact with sidewall 177 of recess 174 and so the support 70 is prevented from moving under the influence of the bias of spring 100 toward the valve seat 62. Valve member 67 is prevented from pivoting about pivot pin 172 172 by engagement with the valve member 67 in coupling half 11.

If the coupling halves 11,12 separate by more than distance R, valve members 67 are able to move about their respective pivot pins 172 toward their intermediate position. In so moving, the projection 173 moves out of recess 174 and so the support 70 and valve member 67 carried thereby is able to move toward seat 62.

Preferably the projection 173 and support 70 have co-operating stop faces 178,179 which are inclined to the axis of the support by an angle of 45°. Accordingly, when Stop faces 178, 179 are in abutment, stem 170 is co-axial with support 70.

As seen in FIGS. 3 and 4, preferably the support 70 is located co-axially with the axis of valve seat 62 of the coupling half 12 and with the valve element 67 when at its intermediate position.

This arrangement reduces the influences of fluid pressure in moving the valve element 67 to its intermediate position and reduces possible fluid shocks. Also, since the support 70 and valve element 67 are co-axial with the valve seat 62 manufacturing tolerances for obtaining a good seal between the valve element 67 and seat 62 are less critical.

The support 70 is an elongate shaft of circular cross-section and so is able to rotate within the bore in boss 74. Accordingly, as the support 70 moves from its first position to its second position it is free to rotate.

Since the support 70 and valve element 67 are co-axial with valve seat 62 such rotation can be utilised to facilitate seating of the valve element 67 upon seat 62 to obtain a good seal.

Figure 5:
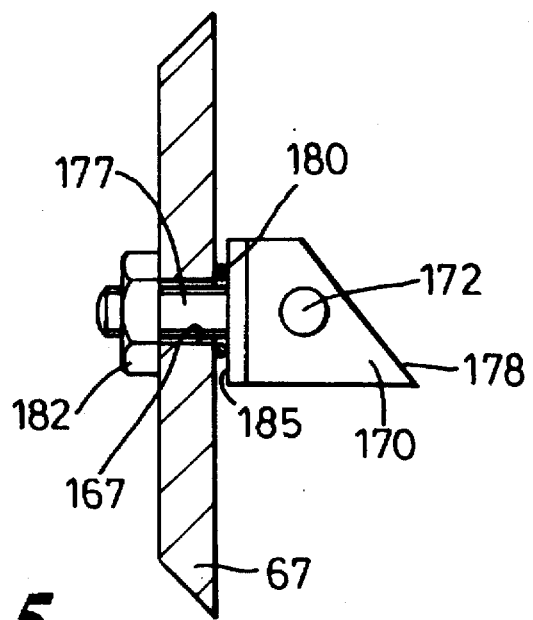
FIG. 5 is a part sectional view similar to FIG. 4 showing a modification to mounting of the valve member.

A modification of embodiment 200 is illustrated in FIG. 5. In FIG. 5, the valve member 67 includes a central bore 167. The stem 170 includes a threaded stub shaft 177 which extends through bore 167 with clearance. An O-ring 180 is located between the valve member 67 and circular end face 185 on stem 170. A nut 182 is received on the stub shaft 177 and compresses the O-ring 180 to provide a sealing connection.

Since the stub shaft 177 is received within bore 167 with clearance, it is possible for the valve member 67 to flex slightly relative to stem 170 and enables the valve member 67 to accommodate slight tolerances in alignment when seating upon seat 62.

It is envisaged that the support 70 and/or stem 170 may be adapted or arranged to co-operate with the boss 74 in order to prevent the support 70 from rotating during axial movement from its first position to its second position.

I claim:

1. A breakaway coupling including first and second coupling parts secured together by releasable means, the releasable means permitting separation of the coupling parts in a given direction when exposed to a separating force in excess of a predetermined force in said direction, at least one of the coupling parts including valve means, the valve means being normally retained at an open position and being movable to a closed position when said coupling parts move apart in said direction, the valve means comprising an annular valve seat formed in said one coupling part, a valve element which when seated on the valve seat prevents fluid flow through said one coupling part, the valve element being movably mounted within the coupling part for movement between open and closed positions, the valve element when at said open position being spaced from the valve seat to permit flow of fluid through the coupling part and when at said closed position being seated upon the valve seat to prevent fluid flow through the coupling part, the valve element being pivotally mounted on an elongate support for movement from the open position to an intermediate position whereat it is opposed to said valve seat but spaced therefrom in said given direction, the support extending longitudinally in said given direction and being movable in said given direction between a first position whereat the support locates the valve element at its open position and a second position whereat the support locates the valve element at its closed position, trigger release means for retaining the support at its first position, the valve element being co-operable with the trigger release means to cause release of the support when the valve element moves to its intermediate position to thereby enable the support to move to its second position and the valve element to move to its closed position.

2. A coupling according to claim 1 wherein said valve element is rotatably mounted for rotation about its axis when moving from said intermediate position to said closed position.

3. A coupling according to claim 2 wherein the elongate support has a longitudinal axis co-axial with the axis of the annular valve seat, the valve element being pivotally mounted on the support so that at its intermediate position it is co-axial with the longitudinal axis of the support.

4. A coupling according to claim 2 or 3 wherein the support is slidably mounted in a boss forming part of the housing of the coupling part, the valve element being mounted on one end of a stem which is pivotally connected to the support about a pivot axis extending perpendicularly to the axis of the support, the stem including a projection located on the opposite side of the pivot axis to the valve element, the projection being located at a stop position when the valve element is located in its open position, the projection when at its stop position being in abutment with the boss to prevent movement of the support from its first position to its second position, the projection being located at a release position when the valve element is located in its intermediate position, the projection when at its release position not being in abutment with the boss to permit the support to move from its first position to its second position.

5. A coupling according to claim 4 wherein the support is rotatable about its axis during movement from its first position to its second position.

6. A coupling according to any of claims 1 to 5 wherein the support is biased by resilient biasing means in a direction toward its second position.

7. A coupling according to claim 1 wherein the valve element is biased by resilient biasing means from its open position to its intermediate position.

8. A coupling according to claim 1 wherein the support includes a sleeve and is slidably mounted in a boss forming part of the housing of the coupling part, the valve element being pivotally connected to the sleeve about a pivot axis perpendicular to the longitudinal axis of the support, the trigger means including a push rod slidably located within the sleeve, one end of the push rod projecting beyond an axial end of the sleeve such that movement of the valve element to its intermediate position causes the valve element to engage the push rod and move it axially within the sleeve to a sleeve release position.

9. A coupling according to claim 1 wherein the first and second coupling parts are telescopically engaged over a predetermined axial distance and each coupling part containing a valve means, the respective valve elements in each coupling part being in mutual abutment to maintain one another at their open position.

10. A coupling according to claim 1 wherein the valve element is flexibly mounted on the support.

* * * * *